(12) United States Patent
Rose et al.

(10) Patent No.: US 7,237,802 B2
(45) Date of Patent: Jul. 3, 2007

(54) CUSHION VENTING DESIGN FOR OUT OF POSITION OCCUPANT PROTECTION

(75) Inventors: Larry D. Rose, South Weber, UT (US); Marc P. Russell, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 111 days.

(21) Appl. No.: 10/832,843

(22) Filed: Apr. 27, 2004

(65) Prior Publication Data
US 2005/0236822 A1    Oct. 27, 2005

(51) Int. Cl.
*B60R 21/16* (2006.01)
(52) U.S. Cl. .................................. 280/743.1
(58) Field of Classification Search ............. 280/743.1, 280/743.2, 740
See application file for complete search history.

(56) References Cited
U.S. PATENT DOCUMENTS

| | | | |
|---|---|---|---|
| 5,016,913 A * | 5/1991 | Nakajima et al. ........... 280/738 |
| 5,280,953 A | 1/1994 | Wolanin et al. ............. 280/739 |
| 5,603,526 A * | 2/1997 | Buchanan .................... 280/739 |
| 6,139,048 A | 10/2000 | Braunschädel ........... 280/728.1 |
| 6,290,257 B1 | 9/2001 | Bunce et al. ................ 280/739 |
| 6,631,922 B2 | 10/2003 | Hess et al. ............... 280/730.2 |
| 6,648,371 B2 | 11/2003 | Vendely et al. ............. 280/739 |
| 6,773,030 B2 * | 8/2004 | Fischer ....................... 280/739 |
| 7,059,634 B2 | 6/2006 | Bossecker et al. .......... 280/739 |

* cited by examiner

*Primary Examiner*—Faye M. Fleming
(74) *Attorney, Agent, or Firm*—Sally J Brown

(57) ABSTRACT

An airbag cushion venting system is disclosed. The system comprises an airbag cushion body having a cushion vent formed therein. A vent cover is attached to the body such that the vent cover at least partially covers the cushion vent in its unconstrained state. A tieback structure holds the vent cover either away from the cushion vent opening or in a position such that a smaller portion of the cushion vent is covered than is covered in the cushion vent's unconstrained state and is adapted to release the vent cover once the body has expanded a sufficient amount to enable the vent cover to at least partially cover the cushion vent.

27 Claims, 10 Drawing Sheets

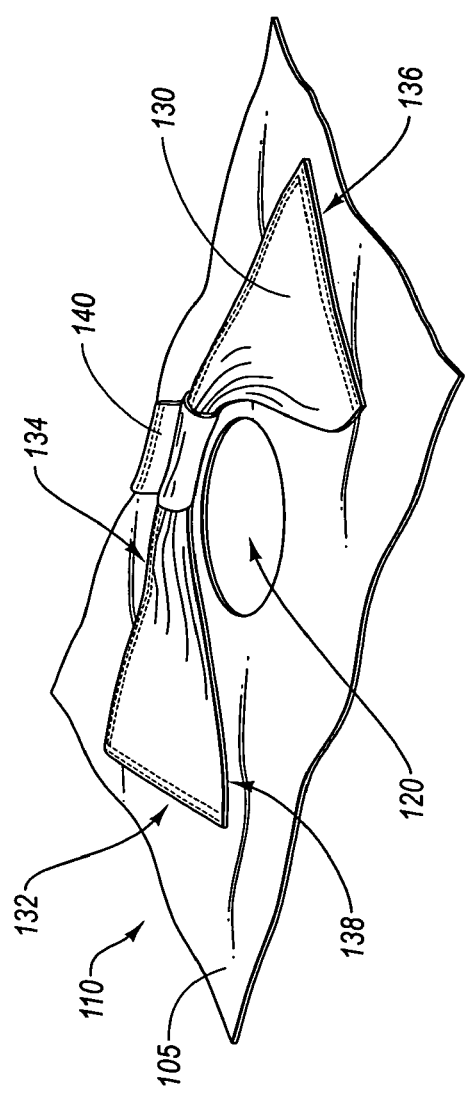
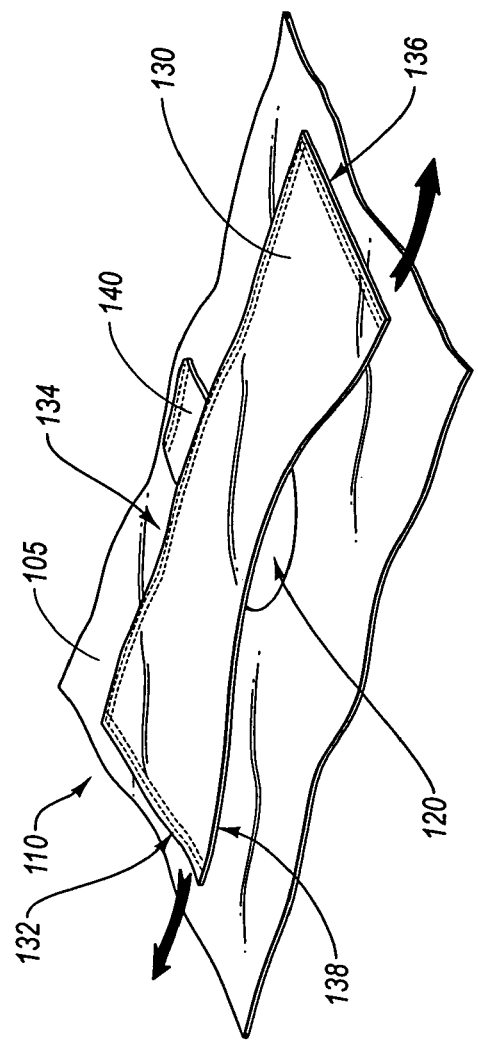
Fig. 1A
Fig. 1B

CUSHION VENTING DESIGN FOR OUT OF POSITION OCCUPANT PROTECTION

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 1A is an enlarged perspective view of a portion of the inside of an airbag cushion incorporating one embodiment of the invention.

FIG. 1B is an enlarged perspective view of the embodiment shown in FIG. 1A following deployment of the unobstructed airbag.

DETAILED DESCRIPTION OF PREFERRED EMBODIMENTS

Figure 2C:
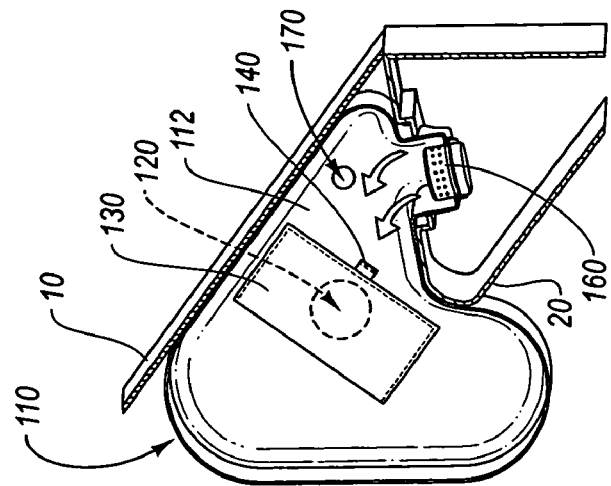
FIGS. 2A–2C depict an airbag incorporating one embodiment of the invention during unobstructed deployment.

The invention described hereinafter relates to inflatable airbags and more specifically to a venting system used to vary the deployment force upon out of position ("OOP") occupants in a vehicle.

The venting system described hereinafter can be applied to airbags or airbag systems during production or can be retrofit to existing airbags or airbag systems. Generally, the system comprises a cushion vent formed in an airbag, a vent cover attached to the airbag such that the vent cover at least partially covers the cushion vent in the vent cover's unconstrained state, and a tieback structure. The tieback structure is adapted to hold the vent cover either away from the cushion vent opening or in a position such that a smaller portion of the cushion vent is covered than is covered in the cushion vent's unconstrained state. The tieback structure is also adapted to release the vent cover once the body has expanded a sufficient amount to enable the vent cover to at least partially cover the cushion vent. The tieback structure should be strong enough to hold the vent cover back until the membrane force from the expanding airbag body, or an optional release cord attached to the airbag body, causes the tieback structure to release the vent cover. The tieback structure and the airbag cushion body are therefore adapted to prevent the vent cover from being released from the constrained state, or to enable the vent cover to be released into the unconstrained state, depending on an occupant's position adjacent to the airbag cushion body at the time of deployment.

With reference now to the accompanying figures, FIG. 1A shows the interior surface 105 of an airbag cushion body 110 of an airbag cushion incorporating one embodiment of the invention. A cushion vent, such as cushion vent 120, is cut or otherwise formed in the airbag cushion body 120. Although cushion vent 120 is shown in the accompanying figures as round, the shape of the cushion vent is not of particular importance. Virtually any shape of vent, and any shape of associated vent cover—including round, triangular, polygonal, etc.—may be suitable. In fact, in some embodiments, the cushion vent may comprise a slit. A vent cover 130 is attached to the airbag cushion body 110 in the vicinity of the cushion vent 120, as depicted in FIGS. 1A–1B. It should be appreciated that, whereas the vent cover 130 in these figures is attached to the interior surface 105 of the cushion, it may be attached to the exterior surface of the airbag cushion in other embodiments.

In embodiments of the invention incorporating a rectangular-shaped vent cover, three sides of the cover—marked as sides 132, 134, and 136 in FIGS. 1A and 1B—may be sewn or otherwise attached to the airbag cushion. The fourth side, shown at 138 in the figures, may then remain unattached so as to allow that side to be gathered or otherwise held away from the cushion vent 130. Of course, many variations are possible. For instance, a portion or portions of side 138 may be attached to the airbag cushion on either side of the cushion vent so as to leave only a portion of side 138 unattached, the side opposite from side 138 (side 134) may remain unattached, or the vent cover may be attached at intervals as opposed to along an entire vent cover side. As long as the essential functional features of the invention are present, any number of alternative structures may be used.

The orientation of the vent cover with respect to the flow of gas in the airbag body is a design variable. However, in many embodiments, including the embodiments shown in the accompanying figures, the "open" portion of the vent cover—i.e., the portion drawn back and held by the tieback structure—will be oriented generally downstream of the gas flow with respect to the opposite side of the vent cover. In other embodiments, however, it may be desirable to adjust the orientation of the vent cover in accordance with airbag unfolding and tieback structure release dynamics.

A tieback structure, such as the tieback structure shown in FIGS. 1A–1B at 140, may be used to hold the vent cover 130 away from the cushion vent 120—as depicted in FIG. 1A—or at least in a position such that a smaller portion of the cushion vent is covered than is covered in the cushion vent's unconstrained state. In other words, the tieback structure when engaged with the vent cover should keep the cushion vent open to a larger extent than it otherwise would be without a tieback structure or when the tieback structure has released the vent cover. Thus, once released from the hold of the tieback structure, the vent cover may tend to naturally reposition itself over the cushion vent, or at least in a position such that a greater portion of the cushion vent is covered.

The tieback structure may comprise any of a number of structures. Examples of a suitable structure include a band, strip, or loop with one end, both ends, or a mid-portion attached to the airbag cushion. The band/strip/loop may include a structure, such as hook-and-loop material, snaps, breakaway stitching, etc., for releasably attaching the band to itself such that the band can be wrapped around the vent cover and attached to itself in a loop to temporarily hold the vent cover in place. Optionally, the tieback structure may include one or more weakened, frangible, scored, or perforated portions to further facilitate releasing of the vent cover. The tieback structure may alternatively comprise two separate pieces attached to the airbag cushion body at different locations which are releasably held together to constrain the vent cover by use of any of the above-referenced structures or any other suitable structure available to one of skill in the art. In accordance with 35 U.S.C. § 112 ¶6, any of the aforementioned structures are examples of tieback means. More particularly, any of these structures are examples of tieback means for holding the vent cover either away from the cushion vent opening or in a position such that a smaller portion of the cushion vent is covered than is covered in the cushion vent's unconstrained state and for releasing the vent cover once the body has expanded a sufficient amount to enable the vent cover to at least partially cover the cushion vent.

The tieback structure may be configured to disengage and release the tieback structure from the vent cover once a particular amount of tension (represented by the arrows in FIG. 1B) in the material of the airbag body is transmitted to the tieback structure from the airbag cushion body material during deployment. Optionally, a release cord, such as the release cord shown at 150 in the embodiment depicted in FIGS. 4A–5C, may extend from the tieback structure. As will be explained in greater detail later, the release cord may be attached at one end to, or integrally formed at one end with, the tieback structure. The opposite end of the release cord may be attached to another portion of the airbag cushion such that, when the airbag is deployed a certain degree or to a particular size, the release cord disengages the tieback structure from the vent cover to allow the vent cover to fully or at least more fully cover the cushion vent.

Thus, the vent cover may be configured such that, when released to its unconstrained state, the vent cover fully covers or at least more fully covers the cushion vent than it does when held by the tieback structure. The tieback structure may release the vent cover in a variety of ways. Two embodiments of the tieback structure are discussed below with reference to FIGS. 2A–3C and 4A–5C, respectively.

Figure 2B:
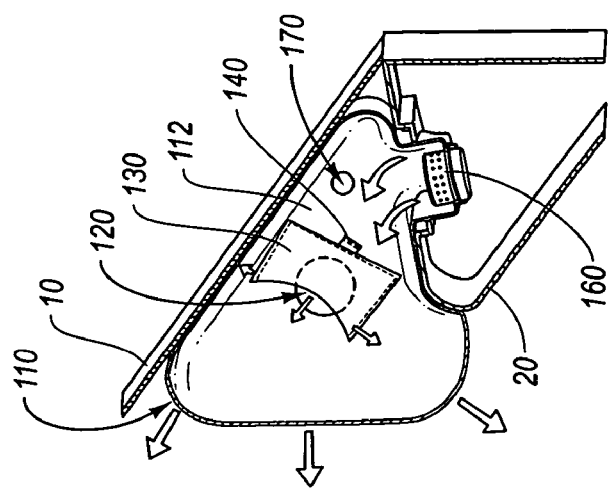
Figure 2A:
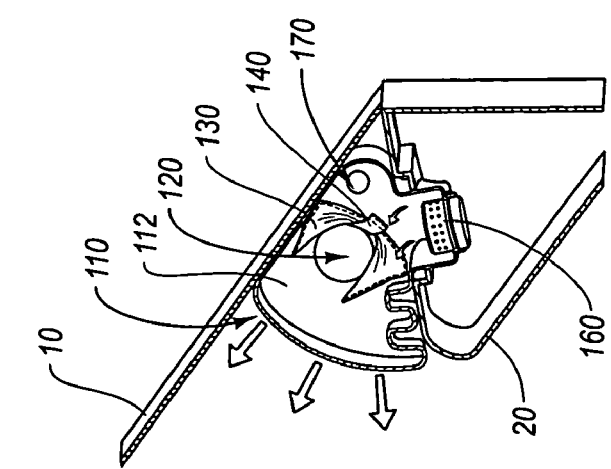

FIGS. 2A–2C depict the inflation or deployment of an airbag system incorporating an embodiment of the invention. The depicted airbag system is positioned in the car's dashboard 20 and deploys against the dashboard 20 and the windshield 10. The sequence shown in FIGS. 2A–2C is intended to depict deployment of an unobstructed airbag. In other words, the occupant is either in his or her proper position in the vehicle away from the airbag deployment location or there is no occupant in the seat adjacent to the airbag system at all. The airbag system depicted comprises an inflator 160, an airbag body 110, a cushion vent 120, a vent cover 130, a tieback structure 140, and a secondary vent 170.

It is contemplated that systems constructed in accordance with the principles of the present invention can include any number of cushion vents. A single cushion vent, two cushion vents—on opposing sides of the airbag body, for instance— or any other number of cushion vents may be used as desired. The cushion vent(s) may be positioned at any suitable location on the airbag body. For instance, if the deployed airbag cushion body has a constricted throat portion-such as throat portion 112 in the accompany figures— the cushion vent(s) could be positioned in the throat portion.

The systems shown in the accompanying drawings also comprise one or more smaller or standard cushion openings, referred to herein as secondary vents 170, which typically do not include a vent cover and are therefore always open. Such secondary vents are, of course, optional, and typically have a smaller cross-sectional area than the cushion vents that are adapted to be covered with a vent cover in accordance with the principles of the invention. In embodiments including one or more secondary vents, it is also possible to cut or otherwise place them in the vent cover such that they allow for secondary venting even when the vent cover is released and in its unconstrained configuration positioned over the cushion vent. In such embodiments, each vent cover may have one or more secondary vents formed therein or, alternatively, only one vent cover or otherwise less than all of the vent covers may have a secondary vent formed therein.

Prior to deployment, the system may be housed in the vehicle's dashboard, instrument panel, steering wheel, or other such location. In the depicted embodiment, the system is housed in the dashboard 20 and as such is positioned partially against the car's windshield 10 when deployed.

FIG. 2A depicts the airbag system in the immediate milliseconds following deployment. The inflation gas or other fluid (represented by the arrows inside the bag) is causing the airbag body 110 to expand in the direction of the arrows just outside of the airbag on the figure. As can be seen in the figure, the tieback structure 140 at this point in time continues to hold the vent cover 130 in place away from the cushion vent 120. It should be noted that, at this early stage during deployment, the system can be configured such that inflation gas loss through the one or more cushion vents is minimal. In such embodiments, the cushion vent(s) may be positioned laterally with respect to the inflation gas flow as opposed to directly in the stream of the gas flow. When the cushion vent(s) are so positioned, the high velocity stream of gas creates a pressure imbalance (Bernoulli effect) which tends to prevent substantial amounts of inflation gas from exiting the airbag.

At the point in time depicted in FIG. 2B the airbag body has expanded sufficiently to allow the tension in the material of the airbag body—i.e., the membrane tension (represented by the arrows next to vent cover 130)—to disengage the tieback structure 140 from the vent cover 130, thereby releasing vent cover 130 and allowing it to spring back into its position over cushion vent 120. In this manner, the inflation gas is impeded from exiting the airbag body and the airbag continues to expand fully to the position shown in FIG. 2C.

Figure 3A:
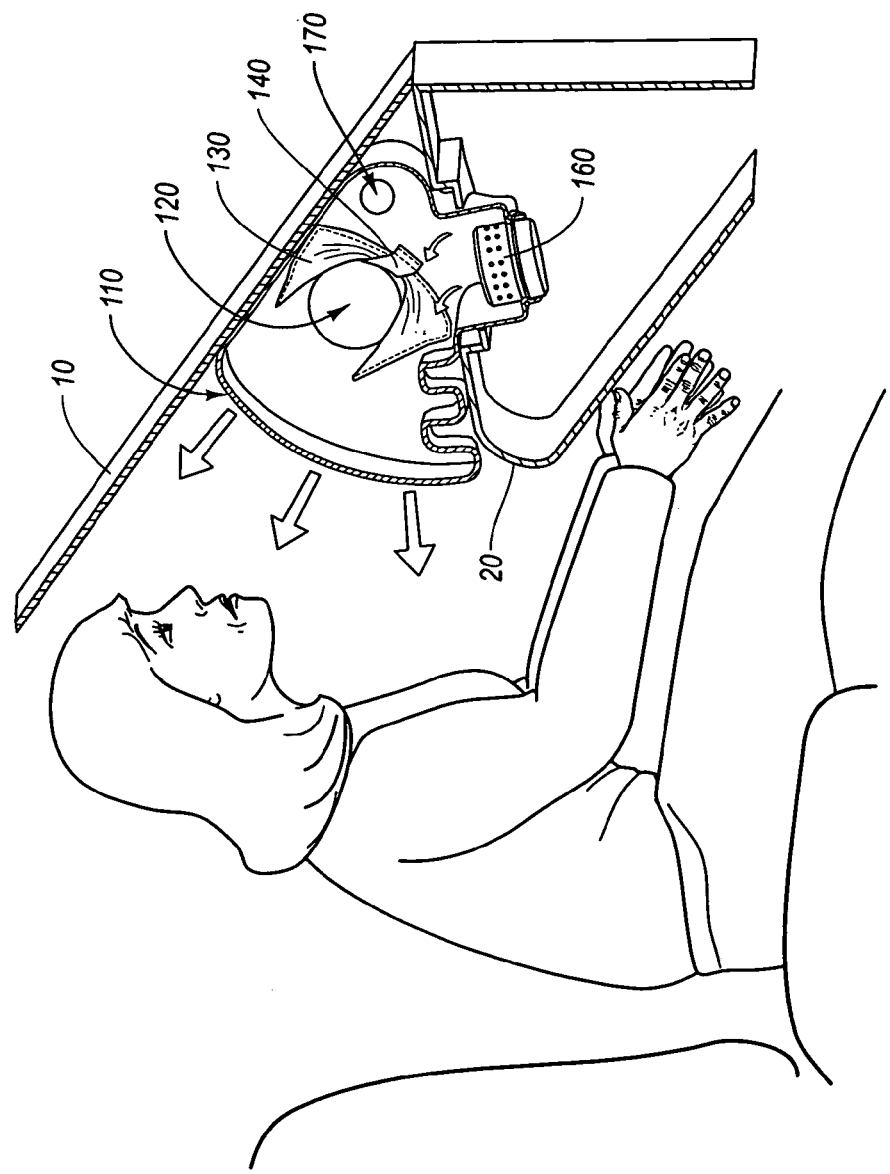
FIGS. 3A–3C depict an airbag incorporating the embodiment of FIGS. 2A–2C during deployment with an out-of-position occupant adjacent thereto.
Figure 3B:
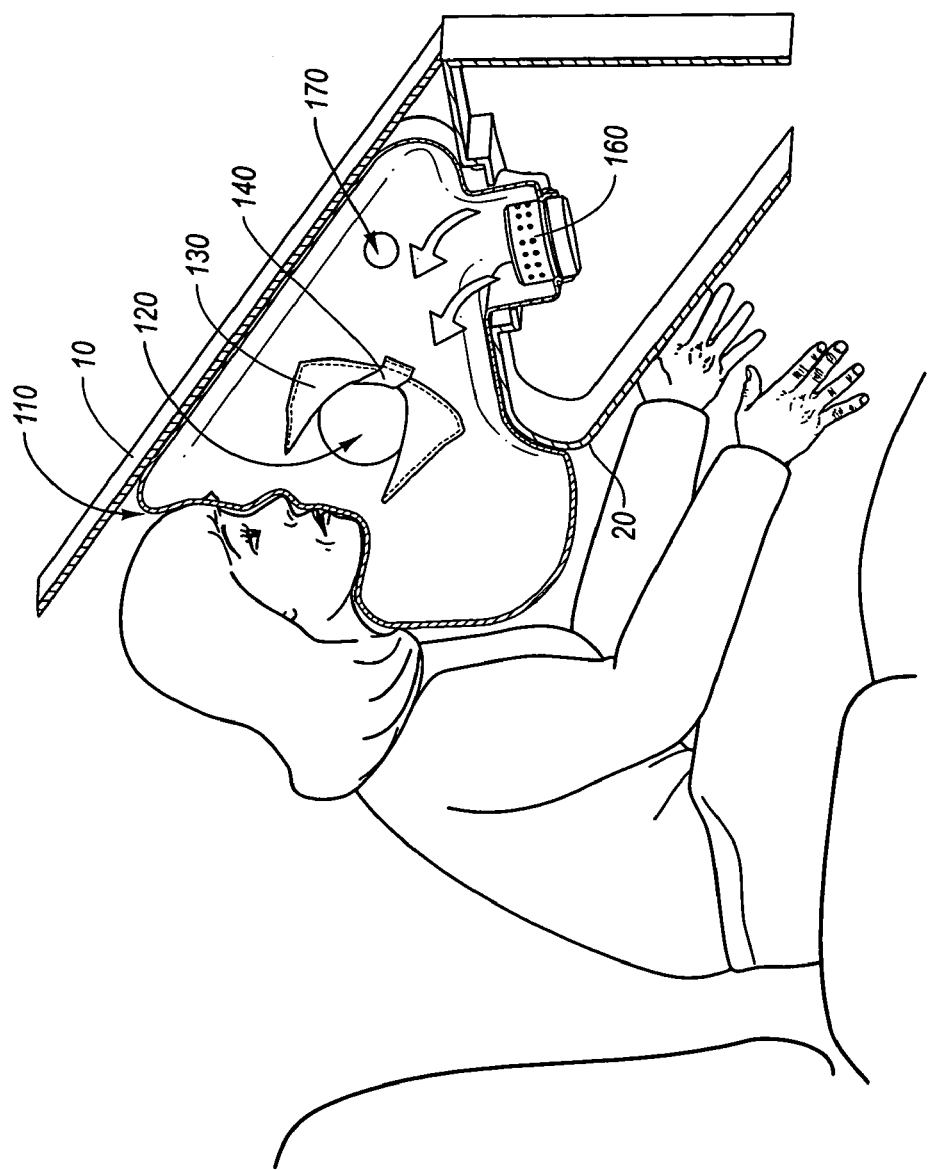
Figure 3C:
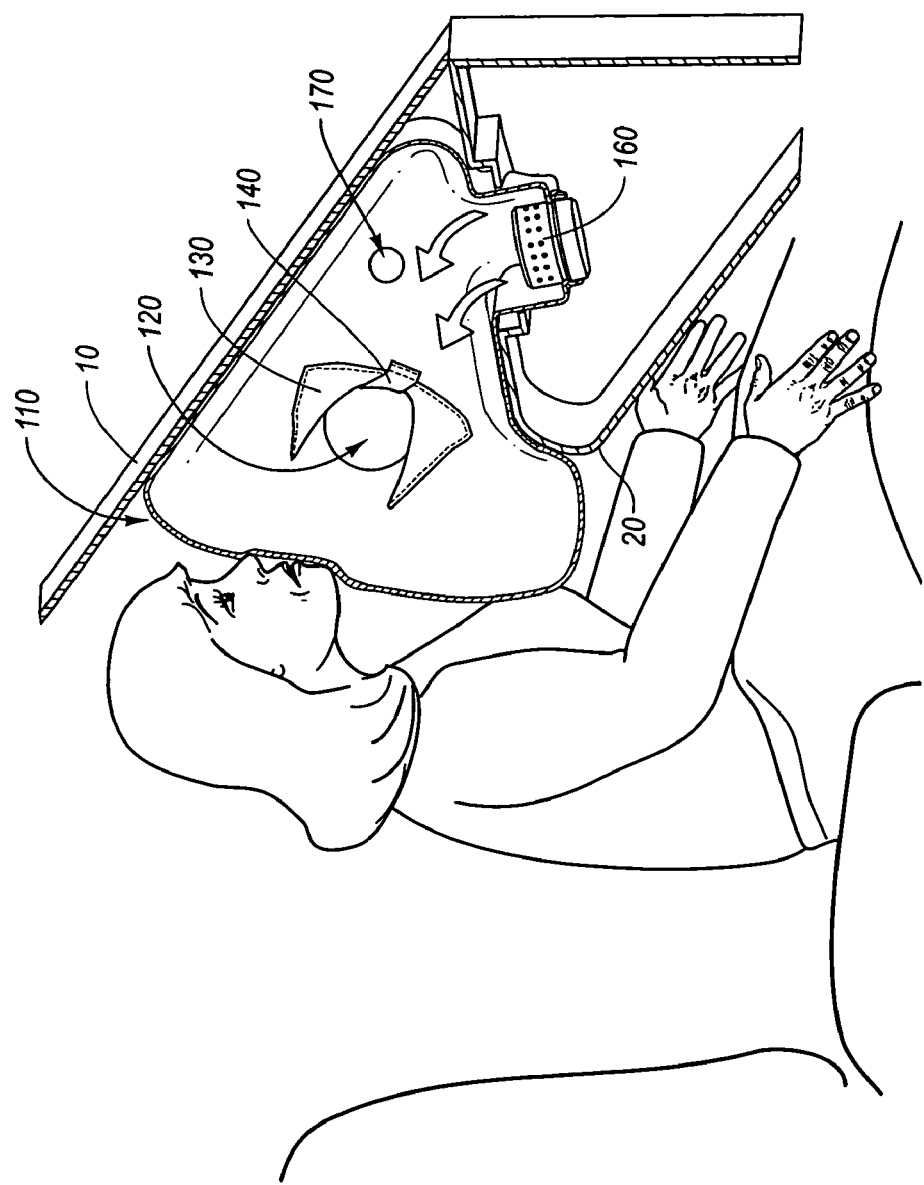

In FIG. 3A, the airbag system is shown in approximately the same stage of inflation as in FIG. 2A. However, in FIG. 3A an occupant is out of position in the adjacent seat. In other words, the occupant is positioned too close to the airbag system at the time of deployment. Due to the presence of the out-of-position occupant, outward expansion of the airbag body 110 is impeded at the stage of inflation shown in FIG. 3B. Because the airbag body 110 is not able to fully expand, the tension transmitted to tieback structure is not sufficient to cause the tieback structure 140 to release the vent cover 130. A substantial amount of the inflation gas therefore rapidly escapes the airbag body via the cushion vent 120. In this manner, the airbag never fully inflates and the out-of-position occupant is subjected to a smaller inflation force. FIG. 3C shows the system following complete deployment of the airbag with an out-of-position occupant adjacent to the system at the time of deployment.

Figure 4C:
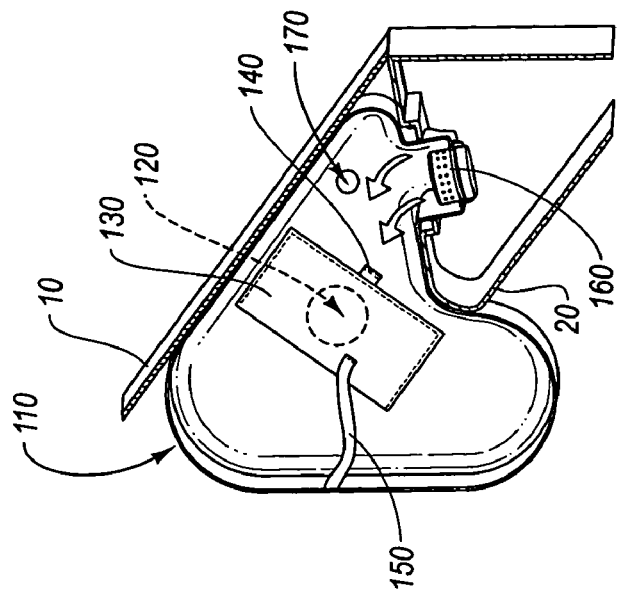
FIGS. 4A–4C depict an airbag incorporating another embodiment of the invention during unobstructed deployment.
Figure 4B:
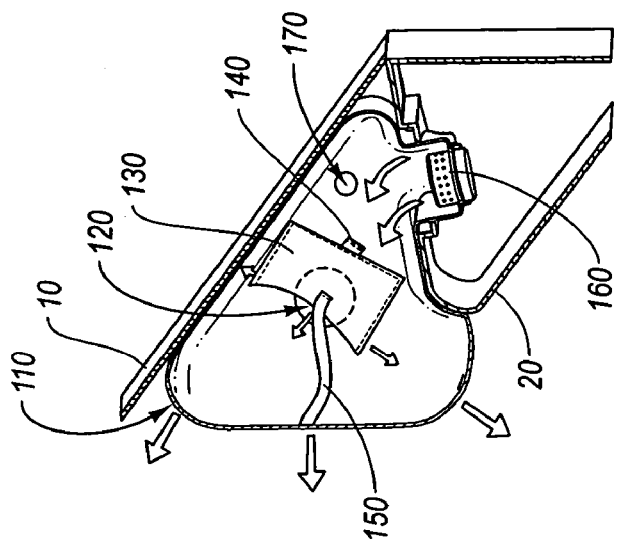
Figure 4A:
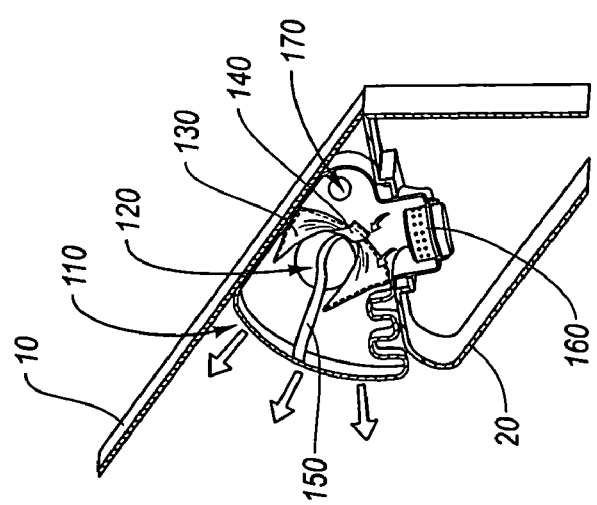
Figure 5A:
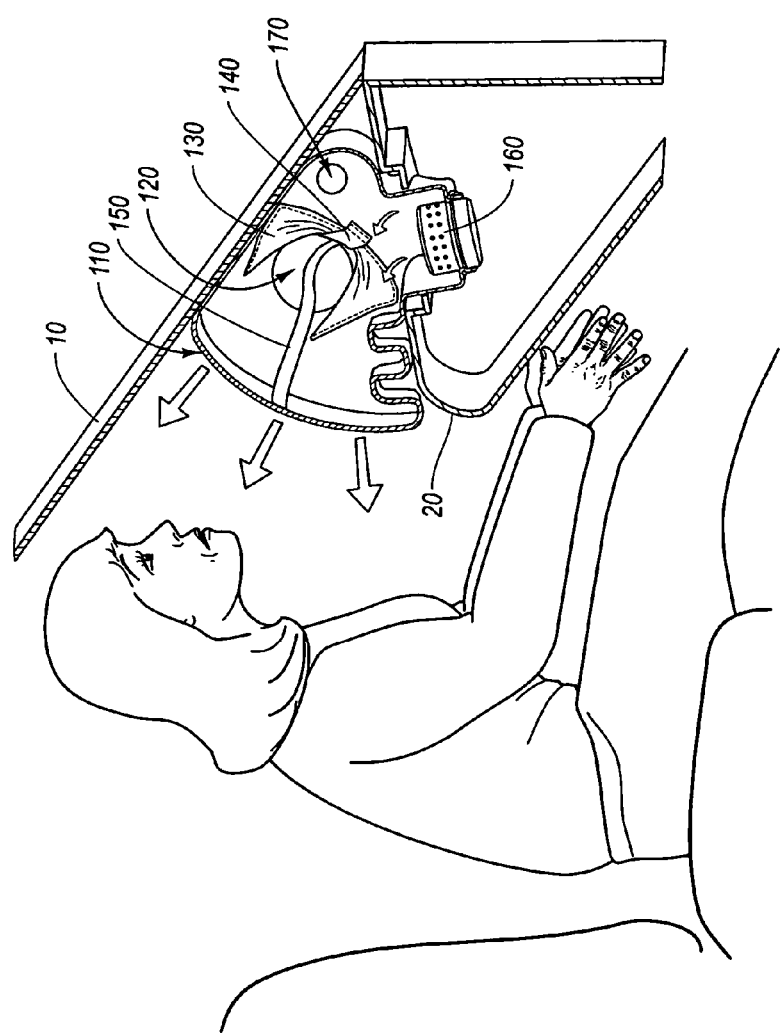
FIGS. 5A–5C depict an airbag incorporating the embodiment of FIGS. 4A–4C during deployment with an out-of-position occupant adjacent thereto.
Figure 5B:
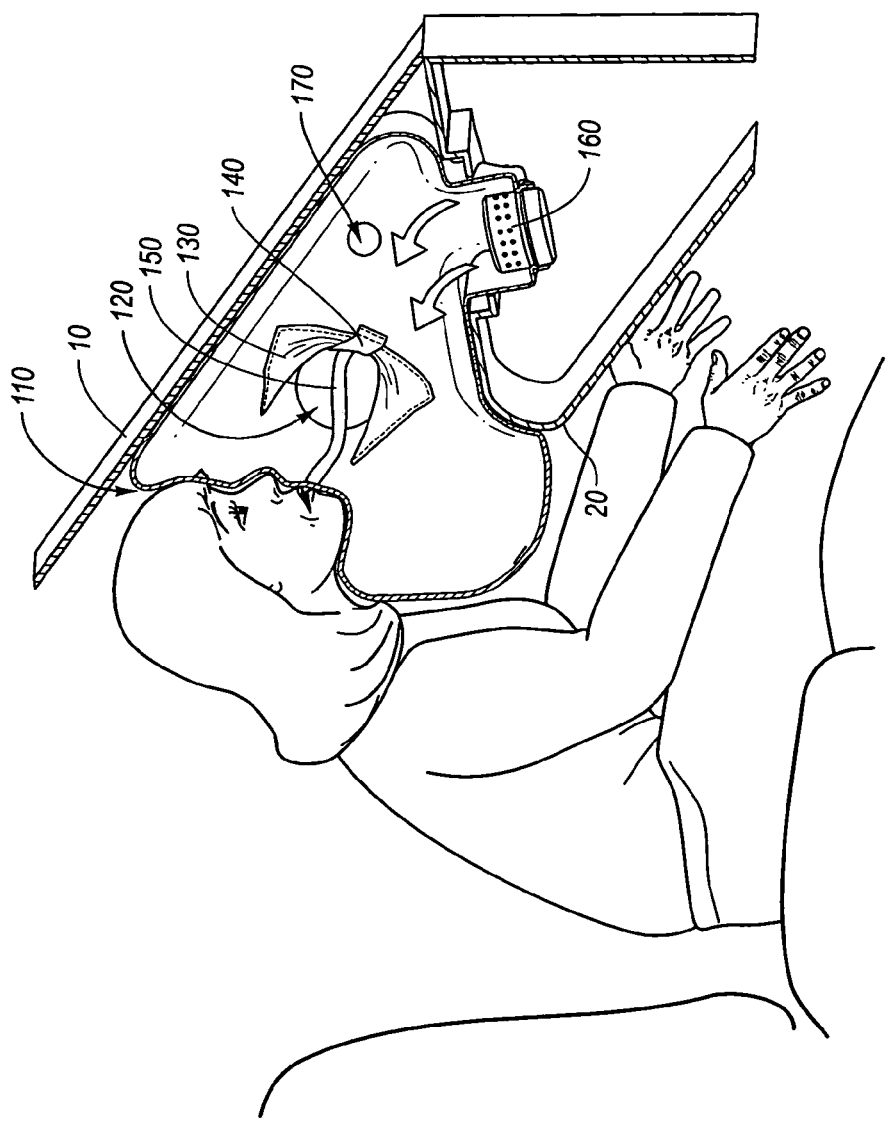
Figure 5C:
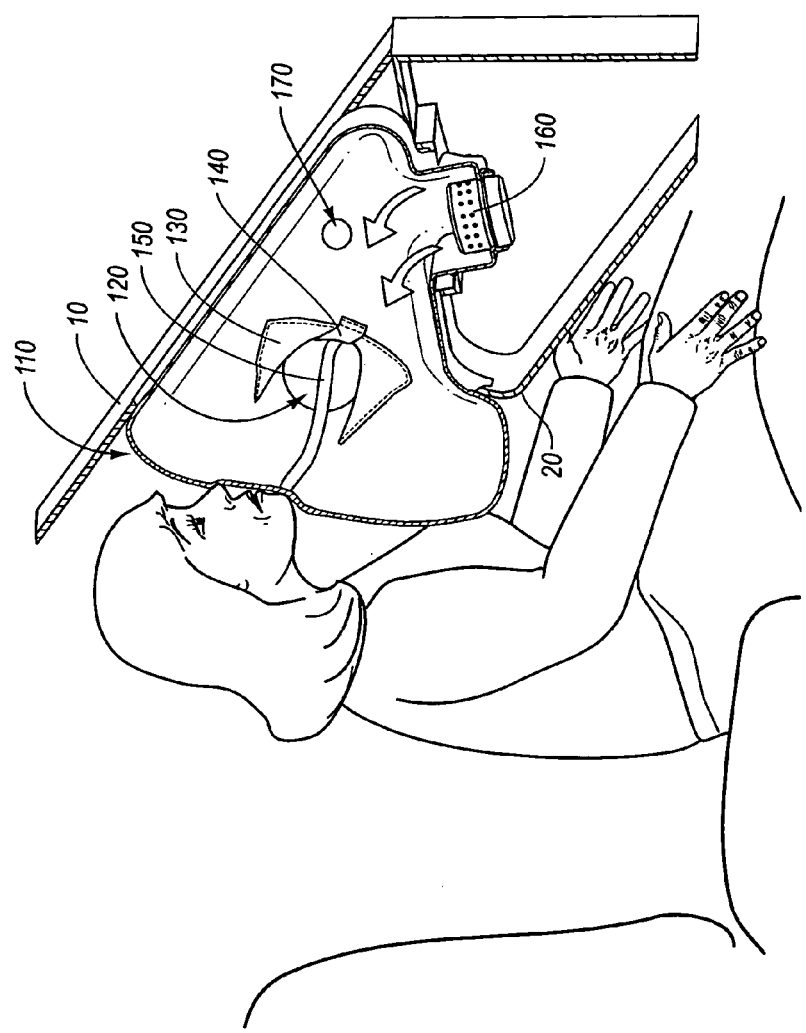
Figure 6A:
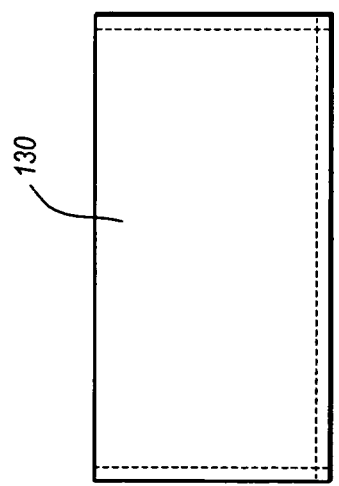
FIGS. 6A–6E depict various vent covers suitable for use in accordance with embodiments of the invention.
Figure 6B:
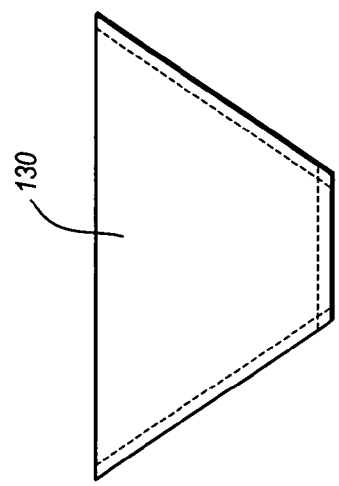
Figure 6C:
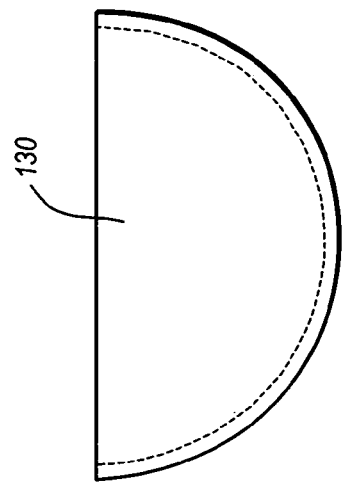
Figure 6D:
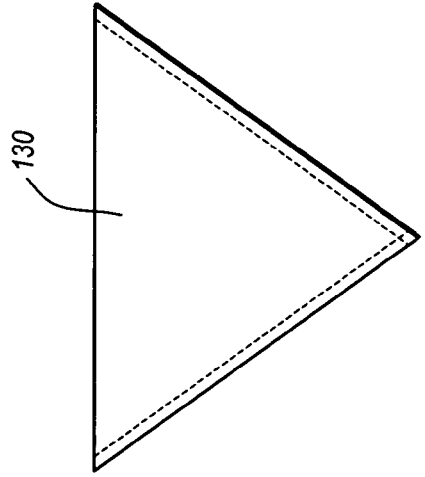
Figure 6E:
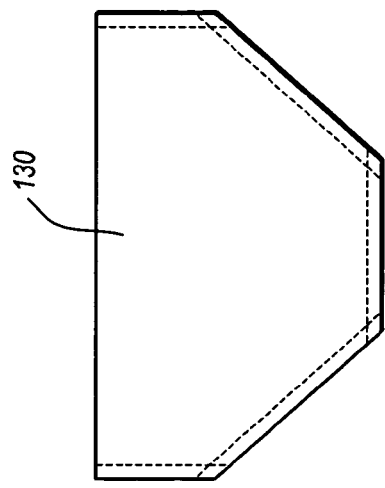

An embodiment of the invention that incorporates a release cord is depicted in FIGS. 4A–5C. FIGS. 4A–4C depict deployment of the airbag system when the adjacent occupant is either missing or in his or her proper position in the car seat. FIGS. 5A–5C depict deployment of the airbag system with an adjacent out-of-position occupant.

In FIG. 4A, release cord 150 has not yet been fully extended. In other words, release cord 150, which is attached to the air bag body 110 at one end and to tieback structure 140 at the other end, continues to have some slack at this point. Vent cover 130 is therefore held back and cushion vent 120 is open. At the stage of deployment shown in FIG. 4B, release cord 150 has been stretched taut and has transmitted tension to the tieback structure 140 to thereby disengage the tieback structure 140 from the vent cover 130. Vent cover 130 in FIG. 4B is therefore in the process of covering cushion vent 120 to prevent or at least impede the escape of inflation gas therethrough. In FIG. 4C, vent cover 130 has covered cushion vent 120 and airbag body 110 is shown fully inflated.

The release cord may interact with the tieback structure in a variety of ways. By way of illustration and not limitation, the release cord may be configured such that it is integrally connected with a tieback structure at one end. In such an embodiment, the end of the release cord comprising the tieback structure may be configured to wrap around the vent cover and then be releasably attached to the airbag body and, optionally, releasably attached to itself as well. Alternatively, the release cord could be separate from, but connectable to, the tieback structure. In these embodiments, the release cord may be attached to—and may facilitate disengagement of—the tieback structure by hooks, snaps, adhesives, loops, stitching, or any other suitable structure. Optionally, the tieback structure may include one or more weakened, frangible, scored, or perforated portions to further facilitate releasing of the vent cover in cooperation with the release cord. Any of the aforementioned structures should be considered tieback means for holding the vent cover either away from the cushion vent opening or in a position such that a smaller portion of the cushion vent is covered than is covered in the cushion vent's unconstrained state and for releasing the vent cover once the body has expanded a sufficient amount to enable the vent cover to at least partially cover the cushion vent.

In FIGS. 5A–5C, the embodiment of the airbag system shown in FIGS. 4A–4C is shown during deployment with an out-of-position occupant adjacent thereto. FIG. 5B is a depiction of a deployment at about the same point in time as that of FIG. 4B relative to deployment initiation. However, in FIG. 5B, the out-of-position occupant's head has made contact with the airbag body. The presence of the out-of-position occupant thus prevents the release cord 150 from fully extending and thereby prevents the release cord from disengaging the tieback structure 140 from the vent cover 130. Because the cushion vent 120 remains open, inflation gas is free to exit therefrom and prevent full inflation of the airbag body 110. In this manner, the pressure and inflation forces on the out-of-position occupant are lessened and the risk for injury from the airbag deployment is reduced accordingly. The out-of-position occupant and the airbag system following complete deployment are shown in FIG. 5C.

Many design variations are possible and should be considered within the scope of the invention. For example, the airbag cushion body may have a plurality of cushion vents formed therein and each of the cushion vents may have an associated vent cover attached to the body and an associated tieback structure. Release cords may extend from each of the respective tieback structures to different portions of the airbag cushion body. As such, the length with which each of the release cords extend from their respective tieback structures to the airbag cushion body may differ in accordance with design specifications.

Accordingly, the design could be tailored to adjust or fine tune the deployment and deployment forces in accordance with various occupant positions. The design could be tailored, for instance, to allow a small number of cushion vents to remain open in the event that an occupant is only slightly out of position, allow a greater number of cushion vents to remain open in the event that an occupant is further out of position, and allow most or all cushion vents to remain open in the event that an occupant is positioned very close to the airbag at the time of deployment. The design could also be tailored to account for a passenger being out of position laterally with respect to the airbag by configuring the release cords to allow primarily the cushion vents on one side of the airbag cushion body or the other to remain open in accordance with the position of the out-of-position occupant.

As previously mentioned, vent covers suitable for use in embodiments of the invention may be shaped and sized in a wide variety of ways as desired. FIGS. 6A–6E depict a few examples of different vent cover shapes. Of course, it should be understood that the shapes depicted in FIGS. 6A–6E are illustrative only and should not be considered limiting. Virtually any shape of vent cover may be used.

Embodiments of the invention may also optionally include protruding features extending from the vent cover. Such features may be shaped and configured to interact with the gas flow and prevent "flutter" at high gas velocities. These protruding features need not be any particular shape or size. Instead, they will be shaped and sized in accordance with desired gas flow characteristics.

It will be obvious to those having skill in the art that many changes may be made to the details of the above-described embodiments without departing from the underlying principles of the invention. The scope of the present invention should, therefore, be determined only by the following claims.

The invention claimed is:

1. An airbag cushion comprising:
   an airbag cushion body having a cushion vent formed therein;
   a vent cover attached to the body; and
   a tieback structure adapted to hold the vent cover in a constrained state and to release the vent cover into an unconstrained state to at least partially cover the cushion vent upon sufficient expansion of the airbag cushion body;
   wherein the tieback structure and the airbag cushion body are adapted to prevent the vent cover from being released from the constrained state or to enable the vent cover to be released into the unconstrained state depending on an occupant's position adjacent to the airbag cushion body when the airbag is deployed;
   wherein the constrained state of the vent cover is achieved by either holding the vent cover away from the cushion vent opening via the tieback structure or by holding the vent cover via the tieback structure such that a smaller portion of the cushion vent is covered than is covered in the unconstrained state of the vent cover.

2. The airbag cushion of claim 1, wherein the airbag cushion body has two cushion vents formed therein and wherein each of the two cushion vents has an associated vent cover attached to the body.

3. The airbag cushion of claim 1, wherein the vent cover is sewn to the airbag cushion body along a portion of the vent cover's periphery.

4. The airbag cushion of claim 1, wherein the vent cover is rectangular in shape.

5. The airbag cushion of claim 4, wherein the vent cover is attached to the airbag cushion body along three of the four sides of the vent cover.

6. The airbag cushion of claim 5, wherein the vent cover is positioned on the airbag cushion body such that the unattached side of the vent cover is oriented downstream of the direction of the eventual gas flow with respect to the side of the vent cover opposite from the unattached side.

7. The airbag cushion of claim 1, wherein the vent cover is attached to an interior surface of the airbag cushion body.

8. The airbag cushion of claim 1, wherein the tieback structure is configured such that membrane tension in the airbag cushion body releases the vent cover once the body has expanded a sufficient amount.

9. The airbag cushion of claim 1, further comprising a release cord extending from the tieback structure, wherein the release cord is connected to the airbag cushion body, and wherein the tieback structure is configured such that tension in the release cord once the body has expanded a sufficient amount is sufficient to release the vent cover.

10. The airbag cushion of claim 1, wherein the airbag cushion body has a secondary vent formed therein and wherein the cushion vent has a larger area than the secondary vent.

11. The airbag cushion of claim 1, wherein the deployed airbag cushion body has a constricted throat portion and wherein the cushion vent is positioned in the throat portion.

12. The airbag cushion of claim 1, wherein the cushion vent is one of two cushion vents formed in the airbag cushion body, wherein each of the cushion vents has an associated vent cover attached to the body, wherein each of the vent covers has an associated tieback structure with a release cord extending therefrom, and wherein the length with which at least one release cord extends from its associated tieback structure to the airbag cushion body differs from the length with which at least one other release cord extends from its associated tieback structure to the airbag cushion body.

13. The airbag cushion of claim 1, wherein the vent cover has protruding features extending from the side of the vent cover exposed to gas flow during deployment.

14. The airbag cushion of claim 1, wherein the cushion vent comprises a slit.

15. The airbag cushion of claim 1, wherein the cushion vent comprises a circular hole.

16. An airbag cushion comprising:
an airbag cushion body having a cushion vent formed therein;
a vent cover attached to the body;
a tieback structure adapted to hold the vent cover in a constrained state and to release the vent cover into an unconstrained state to at least partially cover the cushion vent upon sufficient expansion of the airbag cushion body;
wherein the tieback structure and the airbag cushion body are adapted to prevent the vent cover from being released from the constrained state or to enable the vent cover to be released into the unconstrained state depending on an occupant's position adjacent to the airbag cushion body when the airbag is deployed;
wherein the constrained state of the vent cover is achieved by either holding the vent cover away from the cushion vent opening via the tieback structure or by holding the vent cover via the tieback structure such that a smaller portion of the cushion vent is covered than is covered in the unconstrained state of the vent cover; and
a release cord extending from the tieback structure, wherein the release cord and tieback structure are configured such that exceeding a particular level of tension on the release cord releases the vent cover to enable the vent cover to at least partially cover the cushion vent.

17. The airbag cushion of claim 16, wherein the cushion vent is one of two cushion vents formed in the airbag cushion body and wherein each of the two cushion vents has an associated vent cover attached to the body.

18. The airbag cushion of claim 17, wherein each of the cushion vents has an associated vent cover attached to the body, wherein each of the vent covers has an associated tieback structure tethered to the body with a release cord, and wherein the length with which at least one release cord is tethered from its associated tieback structure to the airbag cushion body differs from the length with which at least one other release cord is tethered from its associated tieback structure to the airbag cushion body.

19. The airbag cushion of claim 16, wherein the vent cover has protruding features extending from the side of the vent cover exposed to gas flow during deployment.

20. The airbag cushion of claim 16, wherein the airbag cushion body has a secondary vent formed therein and wherein the cushion vent has a larger area than the secondary vent.

21. The airbag cushion of claim 16, wherein the vent cover is attached to an interior surface of the airbag cushion body.

22. The airbag cushion of claim 16, wherein the vent cover is sewn to the airbag cushion body along a portion of the vent cover's periphery.

23. The airbag cushion of claim 16, wherein the vent cover is rectangular in shape.

24. The airbag cushion of claim 23, wherein the vent cover is attached to the airbag cushion body along three of the four sides of the vent cover.

25. The airbag cushion of claim 24, wherein the vent cover is positioned on the airbag cushion body such that the unattached side of the vent cover is oriented downstream of the direction of the eventual gas flow with respect to the side of the vent cover opposite from the unattached side.

26. An airbag cushion comprising:
an airbag cushion body having a cushion vent formed therein;
a vent cover attached to the body such that the vent cover at least partially covers the cushion vent in the vent cover's unconstrained state; and
tieback means for holding the vent cover either away from the cushion vent opening or in a position such that a smaller portion of the cushion vent is covered than is covered in the cushion vent's unconstrained state and for releasing the vent cover once the body has expanded a sufficient amount to enable the vent cover to at least partially cover the cushion vent.

27. The airbag cushion of claim 26, further comprising a release cord tethered to the airbag cushion body.

* * * * *